C. VOLKMANN.
SANITARY BUTTER MAKING AND MOLDING MACHINE.
APPLICATION FILED FEB. 19, 1912.
1,117,283.
Patented Nov. 17, 1914.
2 SHEETS—SHEET 1.
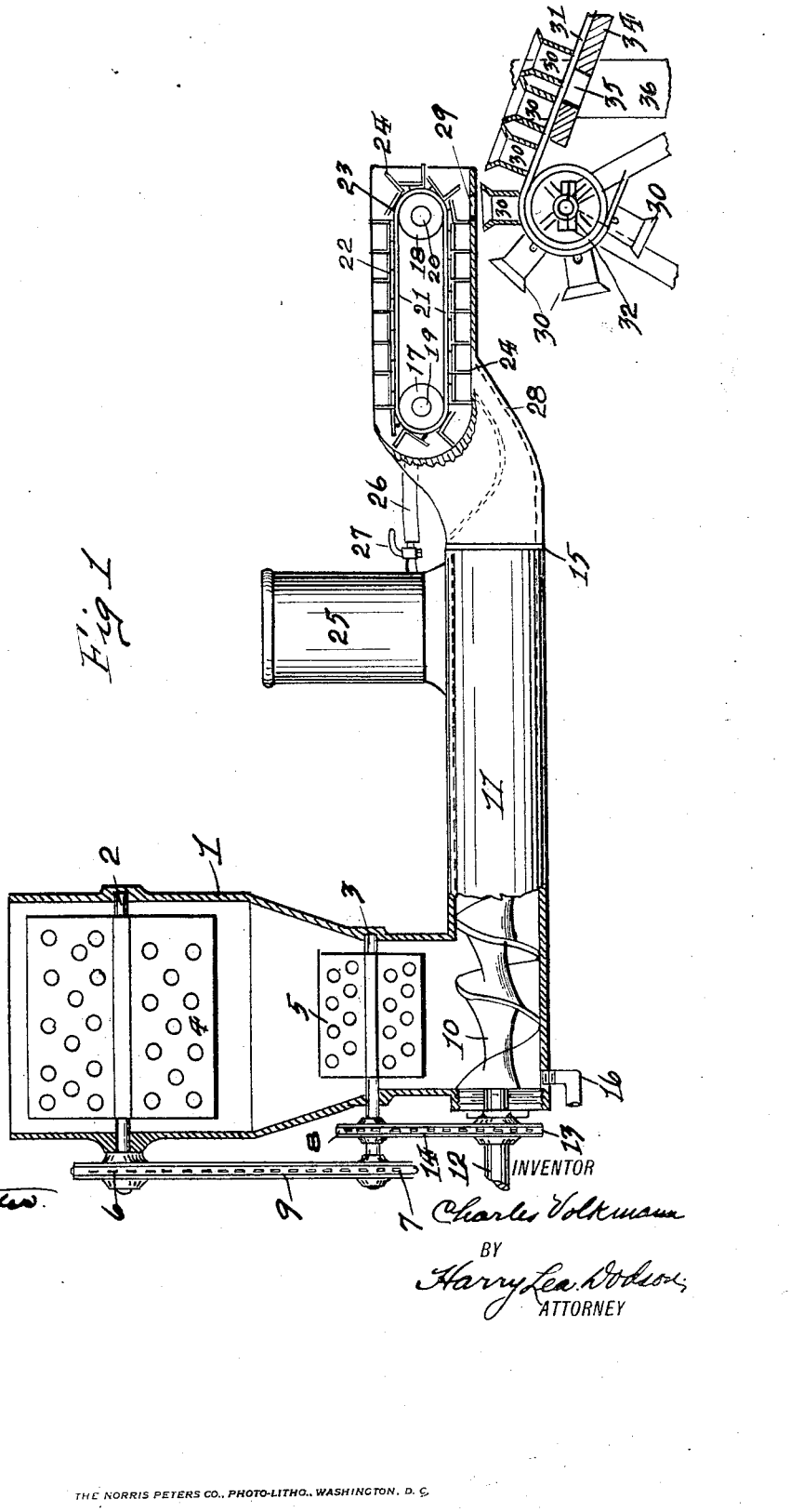

C. VOLKMANN.
SANITARY BUTTER MAKING AND MOLDING MACHINE.
APPLICATION FILED FEB. 19, 1912.
1,117,283.
Patented Nov. 17, 1914.
2 SHEETS—SHEET 2.
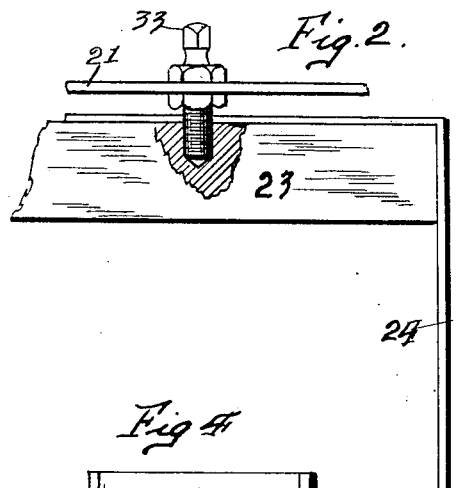
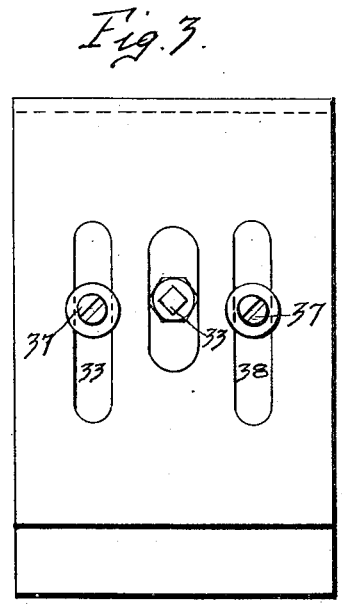
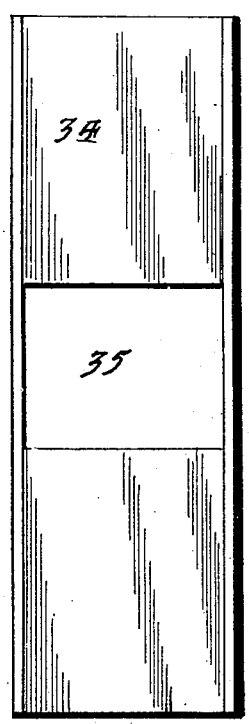
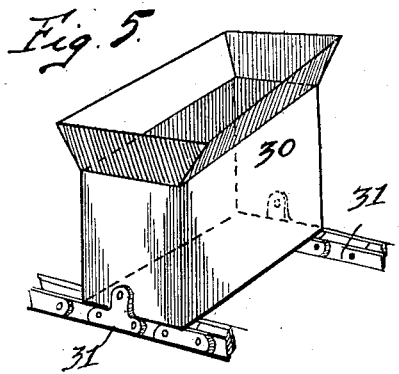
WITNESSES:
INVENTOR
Charles Volkmann
BY
Harry Lea Dodson
ATTORNEY

UNITED STATES PATENT OFFICE.

CHARLES VOLKMANN, OF CHICAGO, ILLINOIS, ASSIGNOR TO UNIVERSAL BUTTER MACHINE COMPANY, OF CHICAGO, ILLINOIS, A CORPORATION OF ILLINOIS.

SANITARY BUTTER MAKING AND MOLDING MACHINE.

1,117,283.      Specification of Letters Patent.     Patented Nov. 17, 1914.

Application filed February 19, 1912. Serial No. 678,694.

*To all whom it may concern:*

Be it known that I, CHARLES VOLKMANN, a citizen of the United States, residing in the city of Chicago, county of Cook, and State of Illinois, have invented a certain new and useful Improvement in Sanitary Butter Making and Molding Machines, of which the following is the specification.

My invention has for its object to provide a machine which will make and mold the butter into bricks of suitable size and deliver it partially wrapped without its being at any time necessary to touch the butter with the hands, and has for its further object to provide means for adjusting the size of the mold to care for the variation and density of the butter being molded.

My means of accomplishing the foregoing may be more readily understood by having reference to the accompanying drawings, which are hereunto annexed and are a part of this specification, in which:

Figure 1 is a side view partly in section of my improved machine. Figs. 2 and 3 are detail views of the molding mechanism. Figs. 4 and 5 are enlarged detail views of parts of the machine.

Similar reference numerals refer to similar parts throughout the entire description.

As shown in the drawings, my machine consists of an upright receptacle 1 which has mounted therein shafts 2 and 3. These shafts are provided with paddles 4 and 5 which extend radially therefrom. A sprocket 6 is mounted upon the shaft 2 and sprockets 7 and 8 are mounted upon the shaft 3. A chain 9 extends from sprocket 6 to sprocket 7.

10 is a conveyer screw which is located in a horizontal cylindrical portion 11, the conveyer screw being mounted upon a shaft 12, which may be driven by any suitable power (not shown).

13 is a sprocket mounted upon the shaft 12 which carries a chain 14, which extends to the sprocket 8 mounted upon the shaft 2.

15 is a cut-off located in the cylindrical portion 11 for use during the churning operation.

16 is a drain located in the lower part of the cylindrical portion 11.

17 and 18 are rollers mounted upon shafts 19 and 20, which are carried by suitable bearings formed in the side walls of the machine. These rollers 17 and 18 carry an endless belt or chain 21, which has secured to it at intervals the molding members 22, which are formed, as more clearly seen in the detail views of a top or stamping member 23 and a side or cut-off member 24. 25 is a receptacle containing water.

26 is a hose, which extends from a faucet 27 to a point adjacent the cutting off blades 24, being adapted to discharge the water on the face of the mold.

The operation of the device is as follows: Cream is placed in the receptacle 1. The shaft 12 is then rotated and through the medium of the chains 9 and 14 causes the rotation of the shafts 2 and 3, which has the effect of whirling the paddles 4 and 5 about rapidly. The motion at this time should be in the direction which will operate to give a reverse motion to the conveyer screw. This causes it to force the liquid upward where it will be brought into contact with the paddles 4 and 5. It will be obvious that it is necessary during this part of the operation to have the shut-off 15 closed. As soon as the butter has come, the drain 16 is opened and the butter milk drained off. Salty water is then placed in the receptacle and the machine is again rotated, and the butter thoroughly worked when the drain 16 is again opened and the salty water drained off. The shafts 12 and 6 are then rotated in the reverse direction. The shut-off valve 15 is opened and the butter is forced outwardly through a nozzle 28 where it is brought in contact with the face of the cut-off blade 24 and when the pressure becomes sufficiently great it operates to move the chain or belt 21 and bring the next adjacent cut-off down through the butter, the pressure of the butter being great enough to cause it to receive any imprint which may be carved on the stamp 23. When it has traveled to the point 29, it drops out of the mold into a metal box 30, a plurality of which are secured to metal chains 31 which run over a roller 32. These metal boxes have no bottoms and are formed with slightly flaring sides at the top, so as to insure the butter dropping in place.

34 is a board, the surface of which is exceedingly smooth and which is provided with an opening 35 which is above a slide 36, which leads to a table, (not shown) or any other convenient storage place.

The operator stands by the machine and places one of the blanks of cardboard, from which the boxes are folded, together with a sheet of paraffin paper on the top of the flaring portion of the metal box 30. As the butter drops from the mold it strikes the cardboard blank and paraffin paper on top of the metal box pressing it down into the metal box thereby making the folds in the sides of the box. Then the belt travels down until it reaches the opening 35 when the box drops out on to the slide 36 whence it passes along the slide to the table or work bench, when the wrapper has simply to fold the ends and the butter is wrapped, the entire operation having been performed without the butter at any time being touched by the hands of the operator.

In order to avoid the possibility of the butter sticking to the mold, I provide a water supply 25 so that through the medium of the hose 26 a stream of water can be kept constantly on the cut-off blades and stamps, immediately prior to the mold receiving the butter, so that it always slides off of them without the least difficulty. The means of adjusting the size of the molds is more clearly seen in the detail views in which I provide a set screw 33, mounted in the back of the stamp 23 and extending into the chain or belt 21. It will be obvious that by operating this screw, you can vary the distance between this stamp and belt, thereby varying the volume of the space into which the butter is to be held. On the back of the stamp 23 are mounted two screws 37, which pass through slots 38 formed in the base of the cut-off blades 24. It will be obvious to persons skilled in the art, that by loosening these screws the cut-off blade can be moved so as to make the mold either larger or smaller. When it is of the right size to give the required weight, the screws 32 are set up tight and serve to hold the cut-off blade rigidly and securely in position.

Having described my invention, what I regard as new and desire to secure by Letters Patent is:

1. In a device of the character described the combination of a receptacle having a plurality of agitators therein, a cylindrical portion extending from the receptacle, having a drain on its lower portion, a conveyer mounted therein, a shut-off located in said cylindrical portion, a nozzle secured to said cylindrical portion provided with a rectangular opening, an endless belt carried by suitable bearings adjacent the said nozzle, a plurality of molds secured to said belt, the sides of which operate as cut-off blades.

2. In a device of the character described the combination of a receptacle having a plurality of agitators therein, a cylindrical portion extending from the receptacle, a conveyer mounted therein, a shut-off located in said cylindrical portion, a nozzle secured to said cylindrical portion provided with a rectangular opening, an endless belt carried by suitable bearings adjacent the said nozzle, a plurality of molds secured to said belt, the sides of which operate as cut-off blades, a water supply, and means to carry the water from said source of supply and spray it on the molds.

3. The combination with a butter making machine of a cylindrical portion leading from said butter making machine, a conveyer mounted in said cylindrical portion, a tapering nozzle secured to said cylindrical portion, an endless belt adjacent the opening of the said nozzle, a plurality of stamps secured to said belt, set screws mounted in the back of said stamps and secured to the chain whereby the distance of the stamp from the chain may be varied, cut-off blades secured to the stamp, slots in said blades and means to secure said blades in position.

4. The combination with a butter making machine of a cylindrical portion leading from said butter making machine, a conveyer capable of producing pressure to back butter mounted in said cylindrical portion, a tapering nozzle secured to said cylindrical portion, an endless belt adjacent the opening of said nozzle, a plurality of stamps secured to said belt, cut-off blades secured to the stamp, slots in said blades, means to secure said blades in position, a water supply, and means to carry the water from said source of supply and spray it on the molds.

5. In a device of the character described the combination of a receptacle having a plurality of agitators therein, a cylindrical portion, extending from the receptacle, having a drain in its lower portion, a conveyer screw mounted therein, a shut-off located in said cylindrical portion, a nozzle secured to said cylindrical portion provided with a rectangular opening, an endless belt carried by suitable bearings adjacent the said nozzle, a plurality of adjustable molds secured to said belt, the sides of which operate as cut-off blades, a plurality of bottomless metal boxes, chains to which said boxes are secured, rollers for said chains carried in suitable bearings, a supporting member intermediate said chains, there being an opening in the said supporting member, a slide from said opening, said chains being arranged to cause the metal boxes to pass beneath the mold at the time that the butter drops from the mold.

In witness whereof I have signed the foregoing specification.

CHARLES VOLKMANN.

Witnesses:
C. M. BAUMEISTER,
K. DOLBEY.